United States Patent [19]
Leowald et al.

[11] 3,961,204
[45] June 1, 1976

[54] FIRING CIRCUIT FOR AN ELECTRIC VALVE

[75] Inventors: Karl-Friedrich Leowald, Weiher; Jakob Schenk, Erlangen, both of Germany

[73] Assignee: Siemens Aktiengesellschaft, Munich, Germany

[22] Filed: Nov. 29, 1974

[21] Appl. No.: 528,486

[30] Foreign Application Priority Data
Dec. 3, 1973   Germany............................ 2360173

[52] U.S. Cl. ...................... 307/252 N; 307/252 UA
[51] Int. Cl.² ........................................ H03K 17/60
[58] Field of Search ...... 307/252 T, 252 UA, 252 N

[56] References Cited
UNITED STATES PATENTS

| | | | |
|---|---|---|---|
| 2,920,240 | 1/1960 | Macklem | 307/252 T |
| 3,098,949 | 7/1963 | Goldberg | 307/252 M |
| 3,381,212 | 4/1968 | Peltola | 307/252 T |
| 3,443,204 | 5/1969 | Baker | 307/252 T |
| 3,723,769 | 3/1973 | Collins | 307/252 T |
| 3,821,634 | 6/1974 | Sabolic | 307/252 UA |

*Primary Examiner*—Harold A. Dixon
*Attorney, Agent, or Firm*—Kenyon & Kenyon Reilly Carr & Chapin

[57] ABSTRACT

The invention concerns a circuit arrangement for firing an electric valve, particularly a thyristor, with a pulse capacitor which can be charged from the a-c voltage at the anode-cathode path of the electric valve by means of an external resistor and can be discharged by means of a contactless switching device for firing the electric valve by way of its control path. To increase the firing performance, there is provided in parallel to the anode-cathode path of the electric valve a series circuit comprising an external resistor and the primary winding of a transformer the secondary winding of which is connected to the pulse capacitor by way of a rectifier.

10 Claims, 2 Drawing Figures

FIRING CIRCUIT FOR AN ELECTRIC VALVE

BACKGROUND OF THE INVENTION

1. Field of the Invention

The invention concerns a circuit arrangement for firing an electric valve, particularly a thyristor, with a pulse capacitor which can be charged from the a-c voltage at the anode-cathode path of the electric valve via an external resistor and can be discharged via a contactless switching device for firing the electric valve via its control path.

2. Description of the Prior Art

A circuit arrangement of this kind is known from the German Pat. No. 1,538,099. The circuit of this German Patent is used particularly for firing one or more thyristors which are arranged in a rectifier circuit for large currents and high voltages. In the known circuit arrangement, the electric valve to be fired is shunted by a series circuit consisting of an external resistor, a charging diode and a pulse capacitor. The charging diode is poled in the current-flow direction of the electric valve. A blocking diode is further arranged antiparallel to the series circuit consisting of the charging diode and the pulse capacitor. The pulse capacitor is charged by way of the external resistor, the external capacitor and the charging diode from the reverse voltage at the anode-cathode path of the electric valve. The charged pulse capacitor can discharge to the control path of the electric valve by way of a contactless switching device, which may be, for instance, a light-controlled thyristor or a thyristor externally controlled via a control transformer. The pulse capacitor is generally shunted, furthermore, by a voltage-limiting element, e.g., a Zener diode.

In the known circuit arrangement, the firing power required at the control path of the electric valve for firing the same is obtained from the a-c voltage at its anode-cathode path. In the interest of reliable firing, the firing power should be chosen high. In the known circuit arrangement, this requirement can be met by making the capacity of the external capacitor and the pulse capacitor large. Such an increase in the capacity, however, frequently is a not advantageous for the circuit, particularly for a rectifier circuit, in which the controlled valve in question is arranged.

It is an object of the present invention to provide a firing circuit such that the firing power available for firing the electric valve is increased without the possibility that the increased capacity exerts a detrimental influence on the circuit in which the electric valve is arranged.

SUMMARY OF THE INVENTION

According to the invention, this problem is solved by providing that the anode-cathode path of the electric valve is shunted by a series circuit which consists of the external resistor and the primary winding of a transformer, and that the secondary winding of the transformer is connected to the pulse capacitor via a rectifier.

Thus, the pulse capacitor is charged by way of a transformer and a rectifier following it from the a-c voltage at the anode-cathode path of the electric valve. The term "a-c voltage" is understood here to mean also a composite voltage with a d-c and an a-c component. In principle, an external capacitor is not necessary here. Even if such an external capacitor is arranged in series with the external resistor, its capacity need not be larger than that of the external capacitor in the known circuit arrangement. The external impedance shunted across the electric valve is in any event not larger than in the known circuit arrangement.

It is considered as a particular advantage that in the circuit arrangement according to the invention an increase in the firing power is obtained without an unjustifiable expenditure of components, cost and space.

It is particularly advantageous to utilize in the circuit arrangement both current directions in the external resistor for charging the pulse capacitor. This can be accomplished by providing a full-wave rectifier as the rectifier. This full-wave rectifier may contain rectifier diodes which are arranged, for instance, in a center-tap circuit or a bridge circuit at the secondary winding of the transformer.

In general, one will provide as the transformer one with a magnetic core. In order to obtain a flat magnetization curve, one may provide that the magnetic core of the transformer has an air gap. The same property can also be achieved if the material of the magnetic core has a sheared magnetization characteristic.

However, it is also possible to provide as the transformer one without magnetic core. Such an embodiment is used if low cost and/or small weight of the circuit arrangement are important. The primary and the secondary winding should be wound here closely on top of each other.

A further embodiment of the circuit arrangement is distinguished by the feature that an auxiliary capacitor is arranged parallel to the primary winding of the transformer. It can be accomplished with such an auxiliary capacitor that voltage jumps of great steepness at the electric valve are avoided.

It has already been mentioned that, in principle, an external capacitor in series with the external resistor is not necessary. In order to keep the ohmic resistance of the external resistor low without increasing the losses of the circuit arrangement thereby, it is advantageous, however, to make use of such an external capacitor. In that case, therefore, an external capacitor is connected in series with the series circuit consisting of the external resistor and the primary winding of the transformer.

DESCRIPTION OF THE INVENTION

Figure 1:
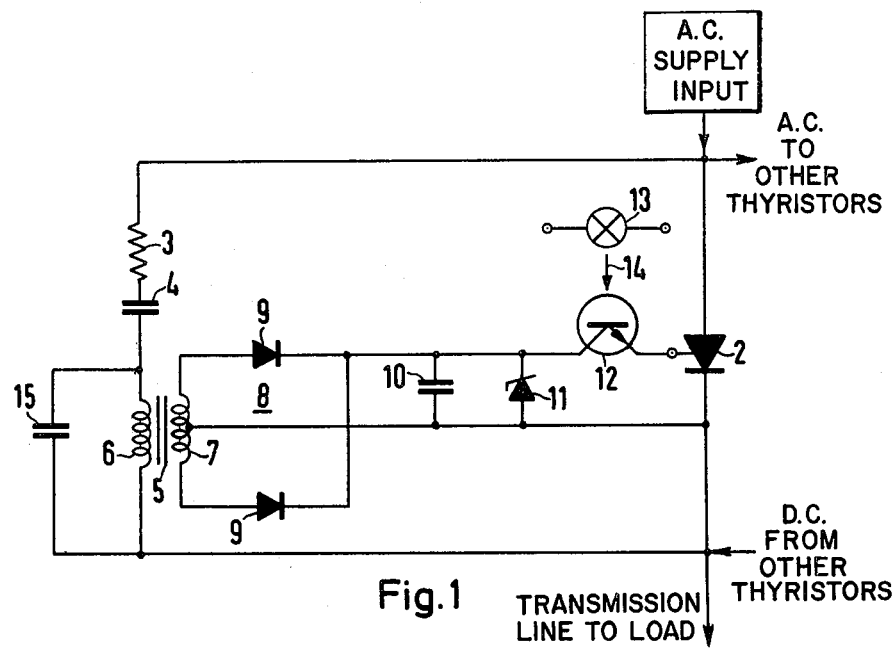
FIG. 1 shows a circuit arrangement for firing an electric valve with an external capacitor.

FIG. 1 shows a circuit arrangement for firing an electric valve 2, which, for instance, is to be able to block an a-c voltage of 50 Hz with a crest value of 2 kV and is preferably a thyristor. This valve 2 is arranged in a converter circuit (not shown), which may be provided for the transmission of high-voltage d-c. In a manner known per se, an R-C member with an external resistor 3 and an external capacitor 4 is associated with the valve 2. The ohmic resistance of the external resistor 3 is, for instance, about 10 to 50 ohms. However, it may also be defined merely by the leads of the external capacitor 4. The capacity of the external capacitor 4 is, for instance, about 0.5 to 2 uF. The external resistor 3 and the external capacitor 4 are connected in series. This series circuit is complemented by the primary winding 6 of a transformer 5. This transformer 5 has a stepdown ratio which is in the range of 1:1 to 20:1 and is preferably 10:1. The entire series circuit consisting of the external resistor 3, the external capacitor 4 and the primary winding 6 of the transformer 5 is arranged parallel to the anode-cathode path of the electric valve 2.

A rectifier 8 is connected to the secondary winding 7 of the transformer 5. This rectifier 8 is preferably designed as a full-wave rectifier. In the present embodiment example it comprises two rectifier diodes 9, which are connected to the secondary winding 7 in a center-tap circuit. The output of this rectifier 8 is applied to a pulse capacitor 10. This pulse capacitor 10 may have, for instance, a capacity of 50 uF. Parallel to the pulse capacitor 10, a voltage-limiting element 11 is arranged. Its response voltage may be, for instance, 20 V. As shown, a Zener diode can be used as the voltage-limiting element 11.

The pulse capacitor 10 is connected in series with a contactless switching device 12 to the control path of the electric valve 2. The contactless switching device 12 is to be, for example, a light-controlled transistor which can be triggered by light radiation from a light source 13, which is shown as a lamp in FIG. 1. The light radiation onto the base of the transistor is indicated by an arrow 14.

In order to avoid voltage jumps of steep voltage slope at the electric valve 2, an auxiliary capacitor 15 may be arranged parallel to the primary winding 6 of the transformer 5. Its capacity can be chosen equal to or smaller than the capacity of the external capacitor 4. It may be, for instance, 0.1 uF.

If an a-c voltage is applied to the anode-cathode path of the valve 2, the pulse capacitor 10 is charged through transformer action by way of the rectifier 8 due to the a-c current which flows through components 3, 4, and 6. The voltage-limiting element 11 assures that the capacitor voltage does not exceed the predetermined threshold value. If the light source 13 is switched-on by means of a control signal, light falls in the direction of the arrow 14 onto the base of the phototransistor, which can be used as the contactless switching device 12. The light source 13 can be arranged at some distance from the contactless switching device 12, and a light guide can be employed for the transmission of the light. In transmitting the control signal to the switching device 12, no attention need therefore be paid to a large potential difference between the light source 13 and the switching element 12.

If light falls on the base of the phototransistor, the latter becomes conducting, so that the pulse capacitor 10 can discharge suddenly onto the control path of the valve 2 and fires the latter.

Figure 2:
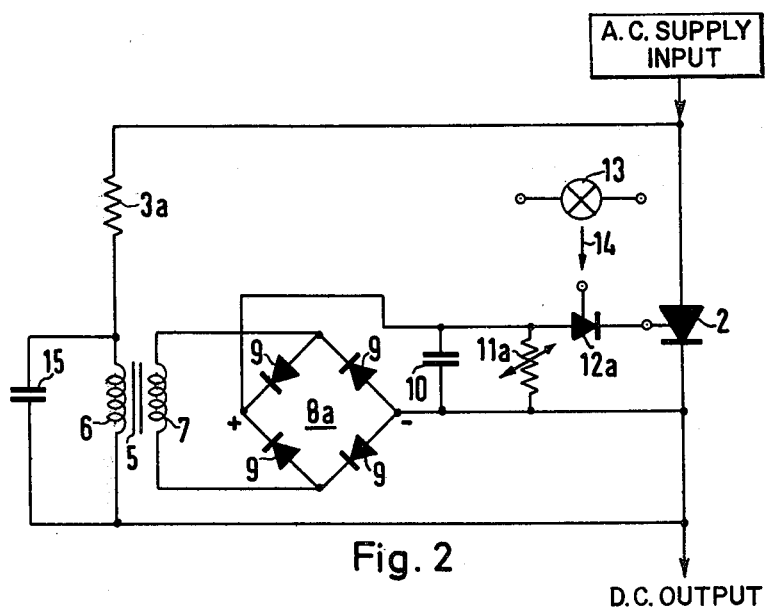
FIG. 2 shows a circuit arrangement for firing an electric valve without an external capacitor.

In FIG. 2, a circuit arrangement for firing an electric valve is shown which corresponds largely to that of FIG. 1, but in which the external capacitor 4 is not necessary. The operation of the circuit arrangement corresponds to the circuit arrangement in FIG. 1. The differences in design are the following:

The resistance of the external resistor 3a will generally be higher than that of the external resistor 3 in FIG. 1. It may be, for instance, between 0.5 and 5 Kohm. The rectifier 8a is one with rectifier valves 9 in a bridge circuit. The voltage-limiting element 11a can be a varistor, as shown, i.e., a voltage-dependant resistance. A photothyristor is shown as the contactless switching device 12a.

The transformer 5 in FIG. 2 is designed preferably so that it has the characteristics of a transformer with a magnetic core of a material with a flat magnetization characteristic. This can be accomplished by making it without a magnetic core or with an air gap in the magnetic core, or with a magnetic core which consists of a material with a sheared magnetization characteristic. In this manner, the d-c component of the current through the components 3a and 6 can be taken into consideration. The d-c component of this current then leads to saturation of the magnetic core only at a large value. Through the choice of the resistance of the external resistor 3a it can be assured that the d-c current component always remains below the saturation current. This property of the circuit is of advantage particularly if a series circuit of valves 2 is operated simultaneously, with each of which a circuit arrangement with a separate transformer 5 is associated.

What is claimed is:

1. A firing circuit for an electric valve with at least three electrodes including an anode, a cathode and a control electrode, the control electrode along with one of the other electrodes forming a control path, said valve having an a.c. voltage at its anode-cathode path, comprising,
 a series connected resistor and primary winding of a transformer in parallel with the anode-cathode path of said electric valve, so as to have an a.c. voltage impressed thereacross,
 a rectifier connected to the secondary winding of said transformer, said rectifier having output terminals wherein a first terminal is at positive d.c. potential with respect to a second terminal, and where said second terminal is connected to the cathode of said electric valve,
 a pulse capacitor connected in parallel across said first and second terminals of said rectifier,
 switching means for discharging said capacitor through the control path of said electric valve, and
 an auxiliary capacitor coupled in parallel across said primary winding of said transformer.

2. The circuit of claim 1 wherein said switching means is a contactless switching device.

3. The circuit of claim 2 wherein said contactless switching device is a light-controlled transistor.

4. The circuit of claim 1 wherein said rectifier is a full-wave rectifier.

5. The circuit of claim 1 wherein said transformer has a magnetic core.

6. The circuit of claim 5 wherein said magnetic core has an air gap.

7. The circuit of claim 5 wherein the material of said magnetic core has a sheared magnetization characteristic.

8. The circuit of claim 1 wherein said transformer has no magnetic core.

9. The circuit of claim 1 wherein a capacitor is connected in series with the series connected resistor and primary winding of said transformer.

10. The circuit of claim 1 wherein the ratio of primary winding turns to secondary winding turns of said transformer is approximately 10 to 1.

* * * * *